United States Patent [19]

Shaw

[11] Patent Number: 5,163,246

[45] Date of Patent: Nov. 17, 1992

[54] ADJUSTABLE TENSION FISH LINE RELEASE

[76] Inventor: Byron Shaw, 711 Dayton St., Davison, Mich. 48423

[21] Appl. No.: 886,160

[22] Filed: May 21, 1992

[51] Int. Cl.$^5$ ............................................. A01K 91/00
[52] U.S. Cl. ................................... 43/43.12; 43/44.92
[58] Field of Search ................... 43/43.12, 44.92, 27.4, 43/17.2; 24/490, 499, 503

[56] References Cited

U.S. PATENT DOCUMENTS

| 3,026,646 | 3/1962 | Weaver | 43/43.12 |
| 4,565,026 | 1/1986 | Bohme | 43/43.12 |
| 4,698,933 | 10/1987 | Shaw | 43/43.12 |
| 4,825,583 | 5/1989 | Kammeraad | 43/43.12 |

FOREIGN PATENT DOCUMENTS 0130165  1/1985  European Pat. Off. .............. 24/490

Primary Examiner—Richard K. Seidel
Assistant Examiner—Chuck Y. Mah
Attorney, Agent, or Firm—Beaman & Beaman

[57] ABSTRACT

A fish line release using a pair of elongated jaw members interconnected at one end and having free ends movable between fish line holding and release positions. The jaw members are resiliently biased toward the closed line holding position by a coil compression spring and the spring is displaceable within jaw member recesses to adjust the distance of the spring from the jaw members' interconnected end and thereby adjust the line holding pressure or tension. Detent means located within the spring receiving recesses locate and maintain the spring as desired, and in an embodiment the spring is located within a carrier having handles to facilitate spring positioning. Convex jaw member engaging surfaces facilitate relative pivotal jaw movement.

20 Claims, 1 Drawing Sheet

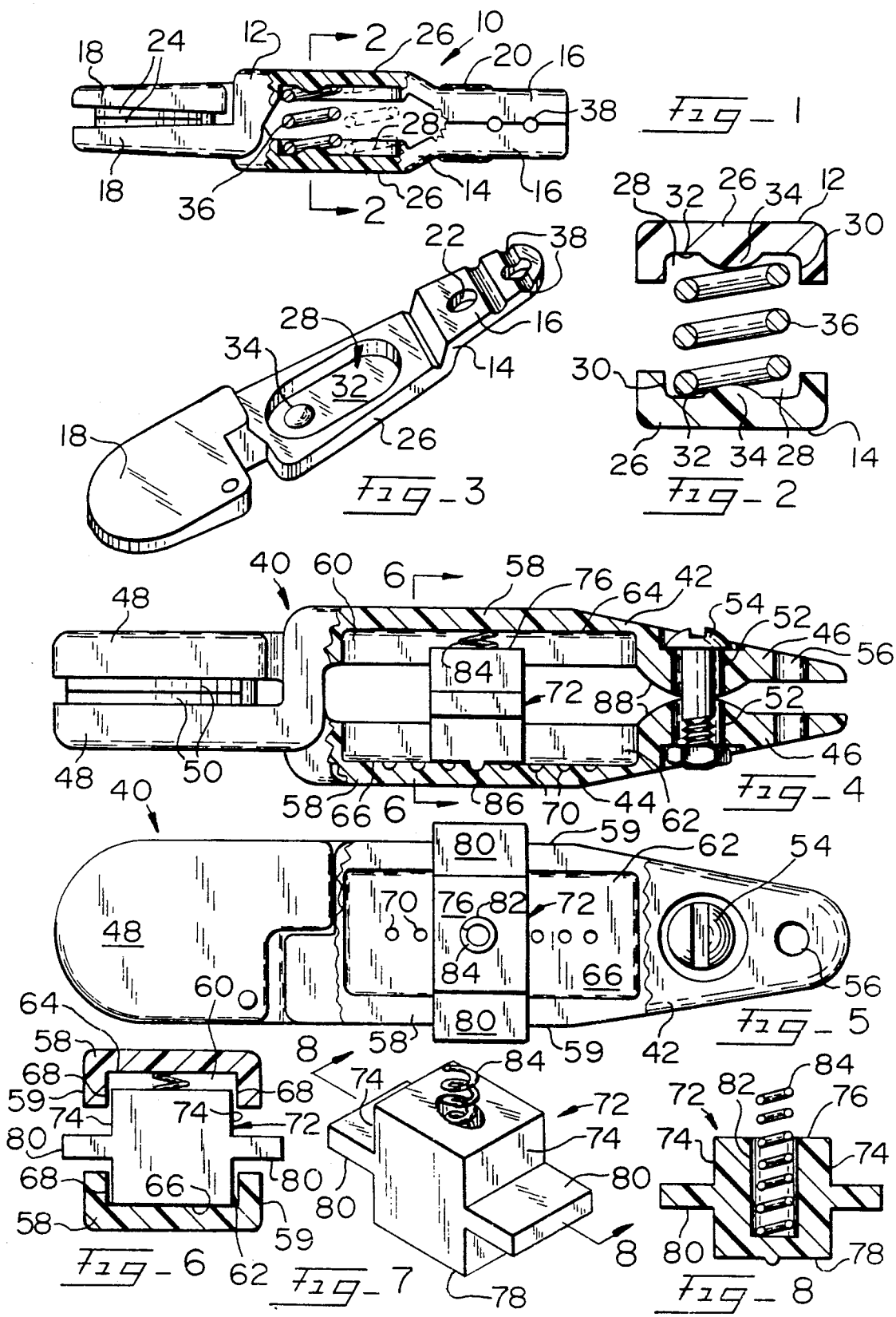

ADJUSTABLE TENSION FISH LINE RELEASE

BACKGROUND OF THE INVENTION

1. Field of the Invention

The invention pertains to fish line releases having adjustable tension wherein the release includes elongated jaw members interconnected at one end and having a fish line engaging free end, the jaw members being biased toward a closed, line engaging position by a compression spring and the biasing force of the spring on the jaw members is adjustable.

2. Description of the Related Art

Fish line releases are utilized to hold a fish line at a location remote from the line supporting pole. Such releases are used to attach fish lines to downrigger weights for locating the bait at a predetermined depth while trolling, or fish line releases may be used to hold the line to the side of the fishing boat for clearance purposes.

In my U.S. Pat. No. 4,698,933, I disclose a popular fish line release construction wherein the line release is formed of a pair of identical jaw members of an elongated configuration interconnected at one end and having resilient line engaging or clamping pads at their free end. A coil compression spring interposed between the jaw members biases the jaw members toward the line engaging position wherein a fishing line may be retained between the jaw member pads. In my U.S. Pat. No. 4,698,933 the compression spring biasing the jaw members surrounded cylindrical studs whereby the location of the spring relative to the jaw members was fixed, and the line holding tension of the jaw member pads was determined by the spring characteristics, and was not adjustable.

Because fish line releases are used with a wide variety of fishing conditions and situations, and are used with a wide variety of fish sizes and weights, it is desirable that the force necessary to cause the fish line to be released from the line release vary. For instance, when fishing for smaller fish, and using lighter tackle, it is desirable that the fishing line release from the apparatus at a relatively low fish line tension. However, when fishing for larger fish at greater depths and using heavier tackle, a much higher fish line tension is desired before the line disengages from the release. In order to accommodate such varying conditions, it has been the practice to use a plurality of fish line releases having predetermined releasing characteristics, and the fisherman purchased that line release which was most appropriate for the fishing conditions of the day. Thus, it is necessary to own a large inventory of fish line releases to accommodate various and differing fishing conditions.

SUMMARY OF THE INVENTION

Objects of the Invention

It is an object of the invention to provide a fish line release of the pivoted jaw type having a spring biasing the jaw members to the closed or line holding position wherein the line holding force produced by the spring may be easily adjusted to permit a single fish line release to accommodate a wide variety of fishing conditions and situations.

Another object of the invention is to provide a jaw type fish line release wherein the jaw members are spring biased toward the line holding position and a variety of line holding forces may be produced from a single coil compression spring by adjusting the distance of the coil spring from the jaw members' interconnected ends.

An additional object of the invention is to provide a jaw member type fish line release wherein the jaw members are of an elongated configuration and are interconnected at one end and are adapted to hold a fishing line at the other end. A coiled compression spring is adjustably positioned along the length of the jaw members to vary the distance of the spring from the interconnected end and thereby adjust the holding forces being imposed upon the fishing line.

A further object of the invention is to provide a fish line release of the pivoted jaw type wherein the jaws are biased toward a closed fish line engaging position by a coil compression spring, and wherein the spring is located within a carrier having an accessible handle whereby the carrier and spring may be easily adjusted along the length of the jaw members to vary the line holding pressures produced by the spring.

Yet another object of the invention is to provide a fish line release of the pivoted jaw type wherein one end of the jaw members are interconnected and provided with convex engaging surfaces to facilitate relative pivoting between the jaw members.

An adjustable tension fish line release in accord with the invention consists of a pair of elongated jaw members preferably formed of a synthetic plastic material. In one embodiment of the invention, the jaw members may be identical. The jaw members are interconnected at one end, and the free end of the jaw members each include a resilient pad between which the fish line to be held and released under predetermined tension is located.

The free ends of the jaw members are biased toward each other by a coil compression spring interposed between the jaw members, the compression spring being located between the opposed jaw members' central regions. The central regions each include an elongated recess receiving the compression spring, and the recesses are of such elongated dimension as to permit the position of the spring to be adjusted along the length of the recesses and jaw members. This adjustment varies the distance of the spring from the jaw members interconnected end, changing the dimension of the torque arm of the force imposed by the spring upon the jaw members. The further the spring is from the jaw members interconnected end, the greater the biasing force imposed on the jaw members by the spring, which increases the clamping force upon the fish line at the jaw members' free end.

Preferably, detent structure is located within the jaw member recesses for maintaining the spring in its desired adjusted position.

In an embodiment of the invention, the coil compression spring is mounted within a carrier having handles which are accessible from the lateral edges of the jaw members permitting the spring to be easily positioned as desired, eliminating the necessity for using a tool for positioning the spring. In this embodiment, the spring carrier is received within the jaw member recesses and includes guide surfaces which cooperate with the recess edges to permit the carrier to be closely received within the recesses. A bore formed in one end of the carrier receives a coil compression spring, and the spring outer end extends from the bore and engages the base surface of one of the jaw member recesses. The other jaw member is provided with a plurality of longitudinally spaced detent cavities which selectively align with a detent projection defined on the other end of the spring carrier. Accordingly, upon aligning the carrier projection with a cavity the compression spring will force the projection into the cavity and maintain the carrier at the desired location of adjustment.

Handles, in the form of wings or extensions, are formed on the carrier having free ends which extend slightly beyond the jaw members' lateral edges. Accordingly, the carrier handle free ends may be readily grasped by the fingers and the carrier displaced within the jaw members' recesses as desired to vary the fish line holding pressure produced by the jaw members. The carrier is easily positioned in its recesses until the projection engages the desired detent cavity, and in larger sizes of the fish line release in accord with the invention, detents may be provided to accommodate six or eight carrier positions.

In the practice of the invention the ability to adjustably position the compression spring relative to the jaw members interconnected ends produces a significant difference in the biasing force imposed on the jaw members' free ends by the spring, and the practice of the invention permits a single size fish release to accommodate a variety of fishing conditions, fish sizes and types of tackle.

It is also a proposal of the invention to improve the relative pivotal relationship between the jaw members by employing convex surfaces at the jaw members interconnected ends through which a fastener extends. The fastener extends through oversized holes, and the convex surfaces engage in line contact transverse to the length of the jaw members wherein a "rolling" engagement between the jaw members is provided which facilitates the pivotal jaw action.

BRIEF DESCRIPTION OF THE DRAWING

The aforementioned objects and advantages of the invention will be appreciated from the following description and accompanying drawings wherein:

FIG. 1 is an elevational view of a fish line release in accord with the invention, partially broken away, illustrating full and dotted line positions of the coil compression spring, FIG. 2 is an enlarged elevational sectional view as taken along Section 2—2 of FIG. 1, FIG. 3 is a perspective view of one of the jaw members of the fish line release of FIG. 1 illustrating the inside surface of the jaw members' central region, FIG. 4 is a side elevational view, partially sectioned, illustrating another embodiment of the invention using a carrier with the spring, FIG. 5 is a top plan view of FIG. 4, the top jaw member central region being broken away to illustrate the lower spring carrier receiving recess, FIG. 6 is an elevational sectional view as taken along Section 6—6 of FIG. 4, FIG. 7 is a perspective view of the spring carrier, per se, and FIG. 8 is an elevational sectional view of the spring carrier as taken along Section 8—8 of FIG. 7.

DESCRIPTION OF THE PREFERRED EMBODIMENTS

FIGS. 1-3 illustrate the simplest form of a fishing line release using the basic inventive concepts of the invention. In these figures, the line release is illustrated at 10 and includes, with reference to FIG. 1, an upper jaw member 12 and a lower jaw member 14. Each of the jaw members includes an interconnected end 16, and a free end 18 which is capable of opening and closing for receiving the fishing line, not shown.

The interconnected ends 16 are interconnected by a rivet 20 extending through holes 22, and the free ends 18 of the jaw members include the resilient pads 24 between which the fishing line is received. The central regions of the jaw members is indicated at 26. The aforementioned fishing line release structure described above is substantially identical to that shown in my U.S. Pat. No. 4,698,933.

Preferably, the jaw members 12 and 14 are molded of a synthetic plastic material such as acetal resin sold under the trademarks Delrin by DuPont Company, or Celcon as sold by the Celanese Corporation. The jaw members 12 and 14 are of identical construction, and preferably, incorporate the line positioning devices disclosed in U.S. Pat. No. 4,698,933.

In accord with the inventive concepts, the jaw member central regions 26, at their inner sides, are each provided with an elongated recess 28. The recesses 28, lengthwise, are parallel to the length of the associated elongated jaw member and are defined by sides 30 and base surfaces 32, which are of a generally planar configuration.

As will be appreciated from FIGS. 1-3, a rounded detent projection 34 extends from each base surface 32 and is located at the end of the recesses 28 closest to the free ends 18.

A coil compression spring 36 is located between the jaw member central regions 26 within the recesses 28, and being under compression endeavors to bias the jaw member central regions 26 away from each other. Due to the offset relationship of the free ends 18, the biasing force of the spring 36 causes the pads 24 to engage each other, and hence, the spring 36 produces the line gripping force on the fishing line, not shown, located between the pads 24.

The dimension of the detent projection 34 is such that the projections 34 will be received within the spring 36, as apparent from FIGS. 1 and 2. Accordingly, the projections 34 will tend to locate the spring 36 within the recesses 28 as shown in FIGS. 1 and 2 wherein the spring 36 will be located at its greatest distance from the jaw member interconnected ends 16. In this position of the spring 36 the biasing force imposed upon the jaw members 12 and 14 by the spring to close the pads 24 is the greatest, and with the spring 36 in the full line position of FIG. 1 the release 10 is adjusted for its maximum line release tension. The mounting holes 38 formed in the jaw members 12 and 14 permits the release 10 to be attached to the associated fishing tackle system, not shown.

By inserting a small screwdriver blade, or similar slender tool, between the jaw member central regions 26 the spring 36 may be shifted toward the interconnected ends 16 to the dotted line position shown in FIG. 1. The shifting of the spring 36 to the right causes the spring ends to ride over the detent projections 34 and locate the spring closer to the interconnected ends 16, which reduces the biasing force tending to the close the jaw members, and reduces the fish line clamping pressures formed by the pads 24. Accordingly, it will be appreciated that in the embodiment of FIGS. 1-3 by the use of a single spring 36, two clamping pressures can be produced at the pads 24 permitting the line release 10 to be employed with a greater variety of fishing tackle, and sizes of fish, than is possible with fish line releases having non-adjustable tension producing springs.

The embodiment of FIGS. 4-8 is capable of producing even greater variations in the line release tension than the embodiment of FIGS. 1-3, and this second embodiment eliminates the need for a special tool to position the compression spring as desired.

In FIGS. 4-8, the line release is generally indicated at 40, and with reference to FIG. 4, an upper jaw member is illustrated at 42, while the lower jaw member is shown at 44. Basically, the 12 release 44 is generally similar to the line release shown in U.S. Pat. No. 4,698,933, and the jaw members are interconnected at ends 46 and each includes a free end 48 upon which the resilient line holding pads 50 are mounted.

At their interconnected ends 46, the jaw members 42 and 44 include aligned holes 52 which receive the bolt and screw 54. The interconnected ends 46 also include the aligned mounting holes 56 which permit the line release to be attached to the tackle system, not shown.

The jaw members 42 and 44 each include a central region 58 defined by lateral edges 59, FIG. 5, the lateral edges 59 being substantially parallel to each other.

The inner side of each central region 58 is formed with a recess, the recess 60 being defined in the jaw member 42, while the recess 62 is formed in the jaw member 44. The recesses 60 and 62 are of a longitudinal configuration extending in the direction of the length of the associated jaw member, and the recess 60 includes the flat base surface 64 while the recess 62 includes the flat base surface 66. The recesses are laterally defined by edges 68 which are in opposed parallel relationship to each other.

A plurality of detent cavities 70 are formed in the recess base surface 66, FIGS. 4 and 5, and the detent cavities 70 are longitudinally spaced with respect to each other and serve to position the spring carrier, as described below.

The spring carrier 72 is preferably formed of a synthetic plastic material and is slidably located within the recesses 60 and 62. The spring carrier 72 includes spaced parallel sides 74, a top surface 76, and a flat bottom surface 78. Extensions or wings 80 project from the carrier sides 74 and each has a free end which extends beyond the jaw member central region lateral edges 59, as will be appreciated from FIGS. 5 and 6.

A bore 82, FIG. 8, is defined in the carrier top surface 76, and receives the coil compression spring 84 whose upper coil engages the base surface 64 of the recess 60.

A projection detent 86 is centrally defined on the carrier bottom surface 78. The configuration of the projection 86 substantially corresponds to the configuration of the detent cavities 70.

As will be appreciated from FIGS. 4-6, the spring carrier 72 is received within the recesses 60 and 62. The rectangular configuration of the spring carrier locates the carrier sides 74 in close relationship to the recess edges 68, and this relationship will prevent the carrier 72 from rotating relative to the jaw members. The upper coil of the spring 84 slidably engages the base surface 64 of recess 60, and the spring biases the carrier bottom 78 against the base surface 66 of recess 62. In this manner the biasing force produced by the spring 84 tends to separate the jaw member central regions 58 causing the fish line holding pads 50 to close and frictionally engage the fish line, not shown.

Adjustment of the location of the spring 84 between the jaw members 42 and 44 is accomplished by grasping the ends of the carrier handles or wings 80 which extend beyond the lateral edges 59 of the jaw members. If the fisherman desires that the pads 50 grip the fish line with greater force to increase the line release tension the spring carrier 72 is moved toward the free ends 48. If a reduced release pressure is desired, the carrier 72 is moved to the right, FIG. 4, toward the jaw member interconnected ends 46. As the spring carrier 72 slides within the recesses 60 and 62 the spring 84 will bias the carrier toward the recess base surface 66 and the projection detent 86 will sequentially engage and then ride out of a detent cavity 70. Upon the carrier 72 being located as desired the projection detent 86 will be located within the selected cavity 70, and the force of the spring 84 will maintain the detent 86 within the desired cavity 70. Therefore, it will be appreciated that the spring 84 functions in the dual capacity of biasing the jaw members 42 and 44 relative to each other as well as maintaining the engagement of the spring carrier detent 86 with a cavity 70.

The use of the handle wings 80 substantially simplifies the adjustment of the line release spring as compared to the embodiment of FIGS. 1-3, and due to the plurality of detent cavities 70, eight being illustrated, fine adjustment of the line release characteristics can be made.

As shown in FIG. 4, pivoting of the jaw members 42 and 44 is facilitated by the use of convex surfaces 88 adjacent the bolt 54. The convex surfaces 88 are generally cylindrical in configuration having a longitudinal axis perpendicularly disposed to the length of the jaw members. Accordingly, the surfaces 88 will engage in line contact. The holes 52 extend through the surfaces 88, and as the diameter of the holes 52 is larger than the diameter of the shank of the bolt 54 extending therethrough, sufficient clearance exists between the bolt 54 and the holes 52 to permit the desired pivoting action between the jaw members 42 and 44 as they are opened and closed by the application of finger pressure to the central regions 58. The rocking or rolling line contact between the surfaces 88 assures a smooth jaw pivoting action, and the bolt 54 will maintain the surfaces 80 in line contact with each other.

From the above description it will be appreciated that the concepts of the invention permit variable fish line release holding forces, and tension release forces, to be achieved merely by locating the coil compression spring as desired within its associated recesses. The practice of the invention eliminates the necessity for the fisherman to stock a large number of line releases depending on the desired release tension, and it is appreciated that various modifications to the inventive concepts may be apparent to those skilled in the art without departing from the spirit and scope of the invention.

I claim:

1. In a fish line release consisting of first and second elongated jaw members positionable between open and closed positions, each jaw member including an interconnected end, a central region having inner sides and lateral edges and a free end, means connecting the jaw members together at their interconnected ends, a compression spring located between the jaw members' central regions biasing the jaw members' free ends toward each other toward the closed position, a fish line engaging portion defined upon each jaw member free end, the jaw member fish line engaging portions being in opposed relation and engaging each other at the jaw members' closed position, the improvement comprising, elongated, spring locating means defined on at least one of the jaw members' central region inner sides extending in the direction of the length of the associated jaw member associated with the compression spring, said spring locating means locating the position of the compression spring between the jaw members with respect to the distance between the spring and the jaw members' interconnected ends, the compression spring being adjustably positionable relative to said spring locating means to selectively adjust the distance between the spring and the jaw members' interconnected ends to vary the force biasing the jaw members' free ends toward each other.

2. In a fish line release as in claim 1, said spring locating means comprising an elongated recess defined in said one jaw member central region inner side, the compression spring being received within said recess.

3. In a fish line release as in claim 2, an elongated recess defined in each of the jaw member central region inner sides, said recesses being in opposed relation to each other, the compression spring comprising a coil spring having first and second annular ends, a spring end being located within each recess.

4. In a fish line release as in claim 3, a detent defined in at least one of said recesses engaging and maintaining the associated spring end at a predetermined position of the spring within said one recess.

5. In a fish line release as in claim 4, said detent comprising a projection adapted to engage the associated annular spring end at said predetermined position of the spring.

6. In a fish line release as in claim 5, a detent projection defined in each of said recesses.

7. In a fish line release as in claim 1, said spring locating means comprising first and second elongated recesses, a recess being defined in each jaw member central region inner side, a spring carrier slidably located within said recesses selectively positionable therein, the compression spring being mounted upon said carrier and biasing the jaw members' free ends toward each other, and handle means defined on said carrier facilitating positioning of said carrier within said recesses.

8. In a fish line release as in claim 7, first detent means defined on said carrier, and second detent means defined in one of said recesses adapted to selectively engage said first detent means at predetermined positions of said carrier within said recesses.

9. In a fish line release as in claim 8, the compression spring comprising a coil compression spring having first and second ends, a recess defined in said carrier receiving said coil spring first end, said second coil spring end extending from said carrier and engaging a jaw member recess.

10. In a fish line release consisting of first and second elongated jaw members positionable between open and closed positions, each jaw member including an interconnected end, a central region having inner sides and lateral edges and a free end, means connecting the jaw members together at their interconnected ends, a compression spring located between the jaw members' central regions biasing the jaw members' free ends toward each other toward the closed position, a fish line engaging portion defined upon each jaw member free end, the jaw member fish line engaging portions being in opposed relation and engaging each other at the jaw members' closed position, the improvement comprising, first and second elongated recesses defined in the jaw members' inner sides, respectively, each having a length extending in the elongated direction of the associated jaw member, each recess including a base surface, a spring carrier located within said recesses interposed between the jaw members, the compression spring being mounted upon said carrier imposing a biasing force upon said recesses' base surfaces and handle means defined upon said spring carrier accessible at the lateral edges of the jaw members for selectively positioning said carrier within the length of said recesses.

11. In a fish line release as in claim 10, said recesses each including spaced, parallel, opposed lateral edges, and guide surfaces defined on said carrier disposed adjacent said recesses, lateral edges whereby engagement of said carrier guide surfaces with said recesses' lateral edges guides the movement of said carrier within said recesses.

12. In a fish line release as in claim 10, a plurality of first detent means defined in one of said recesses longitudinally spaced therein, and second detent means defined on said carrier for selective engagement with a first detent means to selectively longitudinally position said carrier within said recesses.

13. In a fish line release as in claim 12, said first detent means comprising a plurality of longitudinally spaced cavities defined in said base surface of one of said recesses, said second detent means comprising a projection defined upon said carrier adapted to be selectively received within a cavity.

14. In a fish line release as in claim 13, the compression spring biasing said carrier in the direction of said cavities whereby the biasing force of the spring maintains engagement of said projection with an aligned cavity.

15. In a fish line release as in claim 10, a bore defined in said spring carrier, the compression spring being received within said bore and having an outer end extending from said bore, said spring outer end engaging a jaw member recess base surface.

16. In a fish line release as in claim 15, said spring carrier having opposite sides, said handle means comprising wings extending from said carrier opposite sides each having a free end accessible adjacent the jaw members' lateral edges.

17. In a fish line release as in claim 10, said carrier having a first end disposed toward said first recess base surface and a second end disposed toward said second recess base surface, a blind bore defined in said carrier intersecting said carrier first end, the compression spring being located within said blind bore and having an outer end extending therefrom and engaging said first recess base surface, a plurality of longitudinally spaced detent cavities defined in said second recess base surface, and a detent projection defined on said carrier second end adapted to be received within an aligned detent cavity to position said carrier within said recesses, the compression spring biasing the carrier second end into engagement with said second recess base surface and said detent projection into an aligned cavity.

18. In a fish line release consisting of first and second elongated jaw members positionable between open and closed positions, each jaw member including an interconnected end, a central region having inner sides and lateral edges and a free end, means connecting the jaw members together at their interconnected ends, a compression spring located between the jaw members' central regions biasing the jaw members' free ends toward each other toward the closed position, a fish line engaging portion defined upon each jaw member free end, the jaw member fish line engaging portions being in opposed relation and engaging each other at the jaw members' closed position, the improvement comprising, a convex pivot surface defined upon each jaw member interconnected end, said convex pivot surfaces of each jaw member being in opposed engaging relationship, and a fastener extending through said convex surfaces maintaining said convex surfaces in engaging relationship and permitting the jaw members' interconnected ends to pivot relative to each other about said convex surfaces.

19. In a line release as in claim 18 wherein said convex surfaces each have a longitudinal axis perpendicular to the length of the associated jaw member whereby said convex surfaces have line contact engagement.

20. In a line release as in claim 19, said fastener having a first diameter, holes defined in the jaw members intersecting said convex surfaces, said holes having a second diameter greater than said fastener first diameter.

* * * * *